United States Patent
Kuwelkar et al.

(10) Patent No.: US 9,554,168 B2
(45) Date of Patent: Jan. 24, 2017

(54) METHODS AND SYSTEMS FOR SAMPLE RECOVERY IN AVB NETWORKS

(71) Applicant: Harman International Industries, Incorporated, Stamford, CT (US)

(72) Inventors: Heramb Kuwelkar, Fatorda Margao (IN); Nagaprasad Ramachandra, Karnataka (IN)

(73) Assignee: Harman International Industries, Incorporated, Stamford, CT (US)

( * ) Notice: Subject to any disclaimer, the term of this patent is extended or adjusted under 35 U.S.C. 154(b) by 103 days.

(21) Appl. No.: 14/484,082

(22) Filed: Sep. 11, 2014

(65) Prior Publication Data

US 2016/0080784 A1  Mar. 17, 2016

(51) Int. Cl.
*H04L 1/16* (2006.01)
*H04L 1/00* (2006.01)
(Continued)

(52) U.S. Cl.
CPC ............ *H04N 21/2407* (2013.01); *H04L 1/00* (2013.01); *H04L 1/1874* (2013.01); *H04L 12/54* (2013.01); *H04N 21/214* (2013.01); *H04N 21/23406* (2013.01); *H04N 21/41422* (2013.01); *H04N 21/4307* (2013.01); *H04N 21/4381* (2013.01); *H04N 21/43615* (2013.01); *H04N 21/43635* (2013.01); *H04N 21/43637* (2013.01); *H04N 21/44209* (2013.01); *H04N 21/6131* (2013.01); *H04N 21/8547* (2013.01)

(58) Field of Classification Search
CPC ... H04L 43/106; H04L 43/0829; H04L 43/087
See application file for complete search history.

(56) References Cited

U.S. PATENT DOCUMENTS

| | | | | |
|---|---|---|---|---|
| 6,288,739 B1 * | 9/2001 | Hales | ........................ | H04N 7/15 348/14.02 |
| 7,877,774 B1 * | 1/2011 | Basso | ................. | G06F 17/3002 725/115 |
| 2003/0099248 A1 * | 5/2003 | Speciner | ................. | H04M 3/56 370/412 |
| 2007/0237227 A1 * | 10/2007 | Yang | .................... | H04N 17/004 375/240.12 |

(Continued)

OTHER PUBLICATIONS

International Electrotechnical Commission, "IEC 61883-6, International Standard—Consumer Audio/Video Equipment—Digital Interface—Part 6: Audio and Music Data Transmission Protocol," Second Edition, Oct. 2005, 84 pages.

(Continued)

*Primary Examiner* — Maharishi Khirodhar
(74) *Attorney, Agent, or Firm* — Alleman Hall McCoy Russell & Tuttle LLP

(57) ABSTRACT

Embodiments are disclosed for a system for detecting and recovering from missing samples in an audio/video stream. In some embodiments, a system comprises a processor and a storage device storing instructions executable by the processor to determine that a first sample, of a plurality of samples in an audio/video data stream, was not received by a listener device in an audio video bridging system and allocate a first entry in a time slotted buffer for the first sample, wherein the first entry corresponds to a timestamp associated with the first sample. The instructions are further executable to fill the first entry in the time slotted buffer with a second sample immediately preceding the first sample in the audio/video data stream.

20 Claims, 9 Drawing Sheets

(51) Int. Cl.

| | |
|---|---|
| *H04N 21/24* | (2011.01) |
| *H04L 12/54* | (2013.01) |
| *H04N 21/414* | (2011.01) |
| *H04N 21/43* | (2011.01) |
| *H04N 21/436* | (2011.01) |
| *H04N 21/4363* | (2011.01) |
| *H04N 21/438* | (2011.01) |
| *H04N 21/442* | (2011.01) |
| *H04N 21/61* | (2011.01) |
| *H04N 21/8547* | (2011.01) |
| *H04N 21/214* | (2011.01) |
| *H04N 21/234* | (2011.01) |
| *H04L 1/18* | (2006.01) |

(56) References Cited

U.S. PATENT DOCUMENTS

2008/0117901 A1    5/2008  Klammer
2013/0089107 A1*  4/2013  Li ............................ H04L 65/80
                                                        370/412

OTHER PUBLICATIONS

IEEE Standards Association, "IEEE Std 802.1AS-2011, IEEE Standard for Local and Metropolitan Area Networks—Timing and Synchronization for Time-Sensitive Applications in Bridged Local Area Networks," Mar. 30, 2011, 292 pages.

IEEE Standards Association, "IEEE Std 1722-2011, IEEE Standard for Layer 2 Transport Protocol for Time-Sensitive Applications in Bridged Local Area Networks," May 6, 2011, 57 pages.

IEEE Standards Association, "IEEE Std 802.1BA-2011, IEEE Standard for Local and Metropolitan Area Networks—Audio Video Bridging (AVB) Systems," Sep. 30, 2011, 45 pages.

IEEE Standards Association, "IEEE Std 802.1Q-2011, IEEE Standard for Local and Metropolitan Area Networks—Media Access Control (MAC) Bridges and Virtual Bridge Local Area Networks," Aug. 31, 2011, 1365 pages. (Submitted in two parts).

AVNU Alliance, "Automotive Infotainment AVB—Market Requirements Definition," Version 1.00, May 31, 2013, 12 pages.

European Patent Office, Extended European Search Report Issued in Application No. 15181017.3, Nov. 23, 2015, Germany, 10 pages.

Bruneel, H., "A mathematical model for discrete-time buffer systems with correlated output process," European Journal of Operational Research, vol. 18, No. 1, Oct. 1984, 13 pages.

Takagi, H., "Analsysis of Single-Buffer Polling Models for Time-Slotted Communication Protocols," Local and Metropolitan Communication Systems: Proceedings of the Third International Conference on Local and Metropolitan Communication Systems, Springer Science+Business Media Dordrecht, Available as Early as Jan. 1, 1995, 11 pages.

\* cited by examiner

| SOURCE | CHANNEL NUMBER OF SOURCE | CHANNELS FOR SUPERSTREAM |
|---|---|---|
| 1 | 0 | 0 |
|   | 1 | 1 |
| 2 | 0 | 2 |
|   | 1 | 3 |
| 3 | 0 | 4 |
|   | 1 | 5 |

FIG. 8

METHODS AND SYSTEMS FOR SAMPLE RECOVERY IN AVB NETWORKS

FIELD

The disclosure relates to detecting and recovering from missed samples in AVB networks and transmitting super streams in AVB systems.

BACKGROUND

Audio Video Bridging (AVB) is a networking protocol pertaining to streaming audio and/or video data via a network (e.g., an Ethernet network), described in IEEE 802.1 standards (e.g., IEEE802.1BA-2011, IEEE 802.1Q-2011, IEEE 802.1AS-2011, etc.). An AVB network may include one or more talkers (e.g., transmitters) and one or more listeners (e.g., receivers) for transmitting and receiving audio/video data according to the Audio/video transport protocol (AVTP), described in the IEEE 1722-2011 standard.

SUMMARY

In some AVB systems, listeners may be configured to play back media at a presentation time to ensure synchronization amongst the listeners. For example, such synchronization may ensure that audio data from a media item, played out via audio listener devices (e.g., audio playback devices), and video data from the media item, played out via video listener devices (e.g., video playback devices), are matched. In other examples, A/V data may be broadcast to multiple listeners via different routes having different delays. Presentation times may help to ensure that each listener plays back the data at the same time as each other listener. In still other example, A/V data may be provided to an array of audio listener devices (e.g., speakers). Utilizing presentation times, each speaker may be configured to output the A/V data at a particular time relative to other speakers in order to create a particular sound profile. It is to be understood that these examples are not exhaustive, and any suitable AVB network may utilize presentation times.

In each of the above described examples, presentation times may be carried within packets of audio/video data. However, due to network disruptions, data corruption, and/or other factors, some data packets may be lost, leading to missed packets. As only some of the packets may include a valid presentation time, other packets in the stream may be loaded into a buffer for playback at a time based on the receipt time of the packets relative to packets that do include a valid presentation time. If packets from the stream are missing, other packets may be misplaced, thereby affecting playback quality. Embodiments are disclosed for determining detection and recovery of missed samples in AVB networks.

Embodiments are disclosed for a system for detecting and recovering from missing samples in an audio/video stream. In some embodiments, a system comprises a processor and a storage device storing instructions executable by the processor to determine that a first sample, of a plurality of samples in an audio/video data stream, was not received by a listener device in an audio video bridging system and allocate a first entry in a time slotted buffer for the first sample, wherein the first entry corresponds to a timestamp associated with the first sample. The instructions are further executable to fill the first entry in the time slotted buffer with a second sample immediately preceding the first sample in the audio/video data stream.

In some embodiments a method for detecting and recovering from missing packets comprises determining that a first sample, of a plurality of samples in an audio/video data stream, was not received by a listener device in an audio video bridging system and allocating a first entry in a time slotted buffer for the first sample, wherein the first entry corresponds to a timestamp associated with the first sample. The method further comprises filling the first entry in the time slotted buffer with a second sample immediately preceding the first sample in the audio/video data stream.

In some embodiments, a communication system for detecting and recovering from missing packets comprises a talker device configured to transmit samples in an audio/video stream and a listener device communicatively connected to the talker device and configured to receive the audio/video stream from the talker device, the listener device comprising a header analysis module, a missed sample detection and recover module, an output buffer, and instructions executable by a processor of the listener device to determine a timestamp for an incoming packet in the audio/video stream with the header analysis module. The instructions are further executable to determine that a first packet, immediately preceding the incoming packet in the audio/video stream, was not received by the listener device based on a difference between timestamp for the incoming packet and a timestamp of a last received packet, allocate a first entry in the output buffer for the first packet, and fill the first entry in the output buffer with a sample from the last received packet.

BRIEF DESCRIPTION OF THE DRAWINGS

The disclosure may be better understood from reading the following description of non-limiting embodiments, with reference to the attached drawings, wherein below:

FIG. 8 is a chart showing an example mapping of audio source data to super stream channels in accordance with one or more embodiments of the present disclosure.

DETAILED DESCRIPTION

As described above, a communication system may include talker and listener devices. The listener devices may receive audio/video streams from the talker devices and playback each received packet of the audio/video streams at a time designated by a presentation time indicated for that packet (e.g., within a header of the packet). If a packet in the stream is lost, subsequent packets may be presented at a wrong time, as these packets may be inserted into the wrong place in the buffer. As described below, the disclosure provides methods and systems for detecting that a packet is lost and recovering from such lost packets.

In some examples, multiple audio/video sources may provide data for audio/video streams. Instead of sending separate streams for each source, further complicating missing packet detection and recovery, the present disclosure provides methods and systems for combining data from multiple sources into a single super stream.

Figure 1:
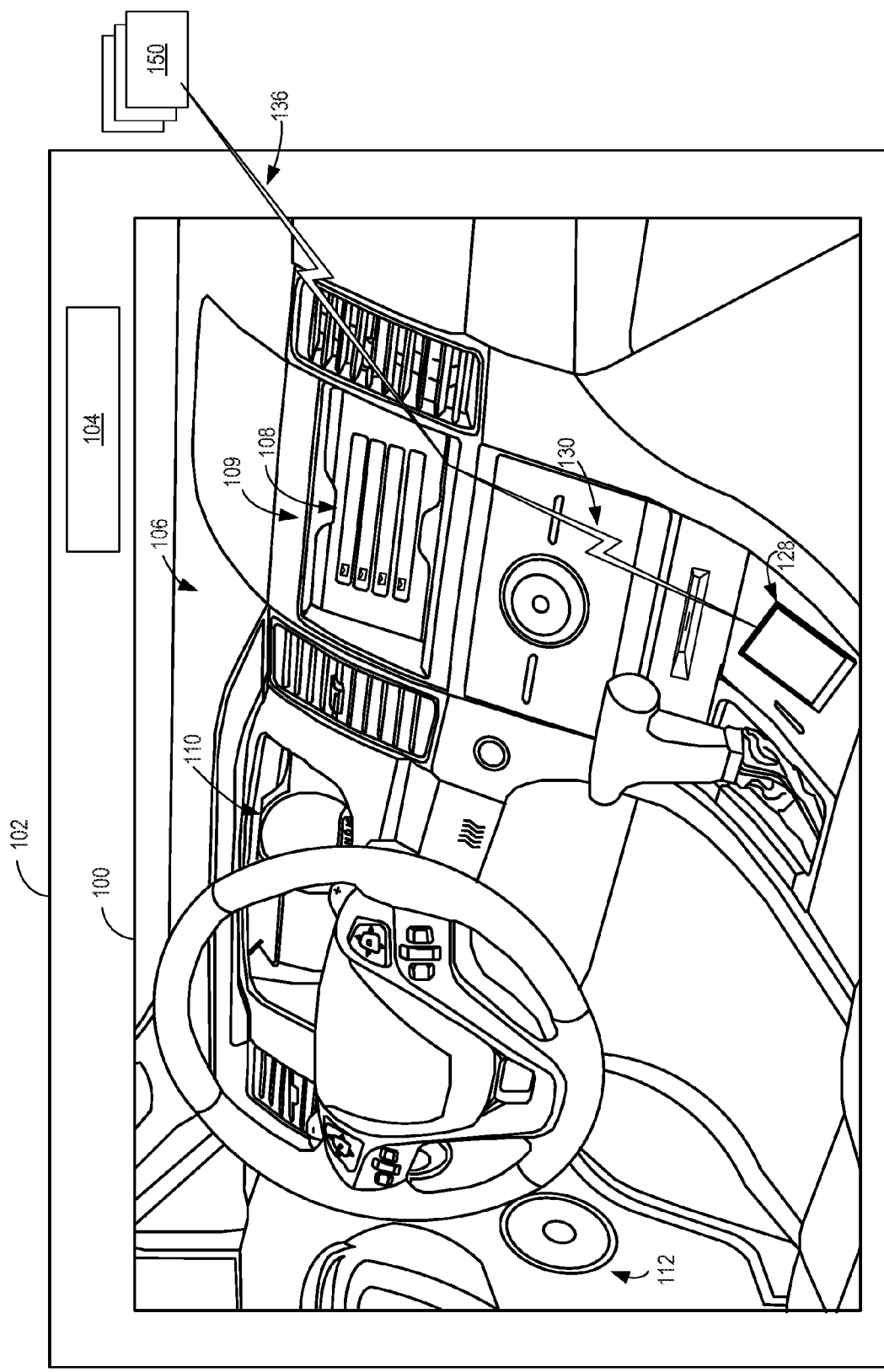
FIG. 1 shows an example partial view of a vehicle cabin in accordance with one or more embodiments of the present disclosure.

FIG. 1 shows an example partial view of one type of environment for a communication system: an interior of a cabin 100 of a vehicle 102, in which a driver and/or one or more passengers may be seated. Vehicle 102 of FIG. 1 may be a motor vehicle including drive wheels (not shown) and an internal combustion engine 104. Internal combustion engine 104 may include one or more combustion chambers which may receive intake air via an intake passage and exhaust combustion gases via an exhaust passage. Vehicle 102 may be a road automobile, among other types of vehicles. In some examples, vehicle 102 may include a hybrid propulsion system including an energy conversion device operable to absorb energy from vehicle motion and/or the engine and convert the absorbed energy to an energy form suitable for storage by an energy storage device. Vehicle 102 may include a fully electric vehicle, incorporating fuel cells, solar energy capturing elements, and/or other energy storage systems for powering the vehicle.

As shown, an instrument panel 106 may include various displays and controls accessible to a driver (also referred to as the user) of vehicle 102. For example, instrument panel 106 may include a touch screen 108 of an in-vehicle computing system 109 (e.g., an infotainment system), an audio system control panel, and an instrument cluster 110. While the example system shown in FIG. 1 includes audio system controls that may be performed via a user interface of in-vehicle computing system 109, such as touch screen 108 without a separate audio system control panel, in other embodiments, the vehicle may include an audio system control panel, which may include controls for a conventional vehicle audio system such as a radio, compact disc player, MP3 player, etc. The audio system controls may include features for controlling one or more aspects of audio output via speakers 112 of a vehicle speaker system. For example, the in-vehicle computing system or the audio system controls may control a volume of audio output, a distribution of sound among the individual speakers of the vehicle speaker system, an equalization of audio signals, and/or any other aspect of the audio output. In further examples, in-vehicle computing system 109 may adjust a radio station selection, a playlist selection, a source of audio input (e.g., from radio or CD or MP3), etc., based on user input received directly via touch screen 108, or based on data regarding the user (such as a physical state and/or environment of the user) received via external devices 150 and/or mobile device 128.

In some embodiments, one or more hardware elements of in-vehicle computing system 109, such as touch screen 108, a display screen, various control dials, knobs and buttons, memory, processor(s), and any interface elements (e.g., connectors or ports) may form an integrated head unit that is installed in instrument panel 106 of the vehicle. The head unit may be fixedly or removably attached in instrument panel 106. In additional or alternative embodiments, one or more hardware elements of the in-vehicle computing system may be modular and may be installed in multiple locations of the vehicle.

The cabin 100 may include one or more sensors for monitoring the vehicle, the user, and/or the environment. For example, the cabin 100 may include one or more seat-mounted pressure sensors configured to measure the pressure applied to the seat to determine the presence of a user, door sensors configured to monitor door activity, humidity sensors to measure the humidity content of the cabin, microphones to receive user input in the form of voice commands, to enable a user to conduct telephone calls, and/or to measure ambient noise in the cabin 100, etc. It is to be understood that the above-described sensors and/or one or more additional or alternative sensors may be positioned in any suitable location of the vehicle. For example, sensors may be positioned in an engine compartment, on an external surface of the vehicle, and/or in other suitable locations for providing information regarding the operation of the vehicle, ambient conditions of the vehicle, a user of the vehicle, etc. Information regarding ambient conditions of the vehicle, vehicle status, or vehicle driver may also be received from sensors external to/separate from the vehicle (that is, not part of the vehicle system), such as from sensors coupled to external devices 150 and/or mobile device 128.

Cabin 100 may also include one or more user objects, such as mobile device 128, that are stored in the vehicle before, during, and/or after travelling. The mobile device may include a smart phone, a tablet, a laptop computer, a portable media player, and/or any suitable mobile computing device. The mobile device 128 may be connected to the in-vehicle computing system via communication link 130. The communication link 130 may be wired (e.g., via Universal Serial Bus [USB], Mobile High-Definition Link [MHL], High-Definition Multimedia Interface [HDMI], etc.) or wireless (e.g., via BLUETOOTH, WI-FI, Near-Field Communication [NFC], cellular connectivity, etc.) and configured to provide two-way communication between the mobile device and the in-vehicle computing system. For example, the communication link 130 may provide sensor and/or control signals from various vehicle systems (such as vehicle audio system, climate control system, etc.) and the touch screen 108 to the mobile device 128 and may provide control and/or display signals from the mobile device 128 to the in-vehicle systems and the touch screen 108. The communication link 130 may also provide power to the mobile device 128 from an in-vehicle power source in order to charge an internal battery of the mobile device.

In-vehicle computing system 109 may also be communicatively coupled to additional devices operated and/or accessed by the user but located external to vehicle 102, such as one or more external devices 150. In the depicted embodiment, external devices 150 are located outside of vehicle 102 though it will be appreciated that in alternate embodiments, external devices may be located inside cabin 100. The external devices may include a server computing system, personal computing system, portable electronic device, electronic wrist band, electronic head band, portable music player, electronic activity tracking device, pedometer, smart-watch, GPS system, etc. External devices 150 may be connected to the in-vehicle computing system via communication link 136 which may be wired or wireless, as discussed with reference to communication link 130, and configured to provide two-way communication between the external devices and the in-vehicle computing system. For example, external devices 150 may include one or more sensors and communication link 136 may transmit sensor output from external devices 150 to in-vehicle computing system 109 and touch screen 108. External devices 150 may also store and/or receive information regarding contextual data, user behavior/preferences, operating rules, etc. and may transmit such information from the external devices 150 to in-vehicle computing system 109 and touch screen 108.

In-vehicle computing system 109 may analyze the input received from external devices 150, mobile device 128, and/or other input sources and select settings for various in-vehicle systems (such as climate control system or audio system), provide output via touch screen 108 and/or speakers 112, communicate with mobile device 128 and/or external devices 150, and/or perform other actions based on the assessment. In some embodiments, all or a portion of the assessment may be performed by the mobile device 128 and/or the external devices 150.

In some embodiments, one or more of the external devices 150 may be communicatively coupled to in-vehicle computing system 109 indirectly, via mobile device 128 and/or another of the external devices 150. For example, communication link 136 may communicatively couple external devices 150 to mobile device 128 such that output from external devices 150 is relayed to mobile device 128. Data received from external devices 150 may then be aggregated at mobile device 128 with data collected by mobile device 128, the aggregated data then transmitted to in-vehicle computing system 109 and touch screen 108 via communication link 130. Similar data aggregation may occur at a server system and then transmitted to in-vehicle computing system 109 and touch screen 108 via communication link 136/130.

In the example environment illustrated in FIG. 1, the in-vehicle computing system 109 may be connected to one or more vehicle systems, such as speakers 112, display 108, vehicle sensors, and/or other suitable vehicle systems via any suitable network. In some examples, the in-vehicle computing system 109 includes a talker device configured to transmit audio/video data to listener devices, such as speakers 112 and display 108 via a network. The network may be configured in accordance with Layer 2 of the Open Systems Interconnection (OSI) model, in which routing and forwarding decisions or determinations in the network may be performed on a media access control (MAC) addressing basis. An example Layer 2 network may be an Ethernet Audio/Video Bridging (AVB) network. For Layer 2 networks configured as AVB networks, the talker 130 and listeners may be configured to communicate over the AVB network 110 using various AVB standards and protocols, including the Institute of Electrical and Electronics Engineers (IEEE) 802.1AS-2011 (gPTP) for network timing and synchronization, IEEE 802.1Q-2011 clause 34 for queuing and forwarding streaming data, IEEE 802.1Q-2011 clause 35 (Stream Reservation Protocol (SRP)) for reserving a network connection or path and/or resources such as bandwidth for communication over the network connection, and/or IEEE 1722-2011/1722a related to a possible data streaming format. Other AVB-related standards and protocols, and/or other versions of the AVB standards and protocols, previously, currently, or later developed, may also or alternatively be used.

The in-vehicle computing system may stream audio/video data based on information stored in local storage and/or audio/video data received from mobile device 128 and/or external device(s) 150. Presenting the audio/video data via the speakers 112 and display 108 in accordance with a presentation time included in packets of the audio/video data stream even when packets are lost during transmission may ensure that the audio output at the speakers matches the video output at the display (e.g., without lip-sync error that arises from audio that leads video and/or video that leads audio) and that any disruptions in the audio/video stream are minimized.

It is to be understood that FIG. 1 depicts one example environment, however the communication systems and methods described herein may be utilized in any suitable environment. As another example, speakers in a professional audio environment (e.g., an arena, stadium, concert hall, amphitheater, recording studio, etc.) may be utilized as listeners that receive audio data from a talker device (e.g., a mixing console, audio/video receiver, etc.) over an AVB network. Any suitable devices that transmit and/or receive packets may be utilized as the systems and/or to perform the methods described herein.

Figure 2:
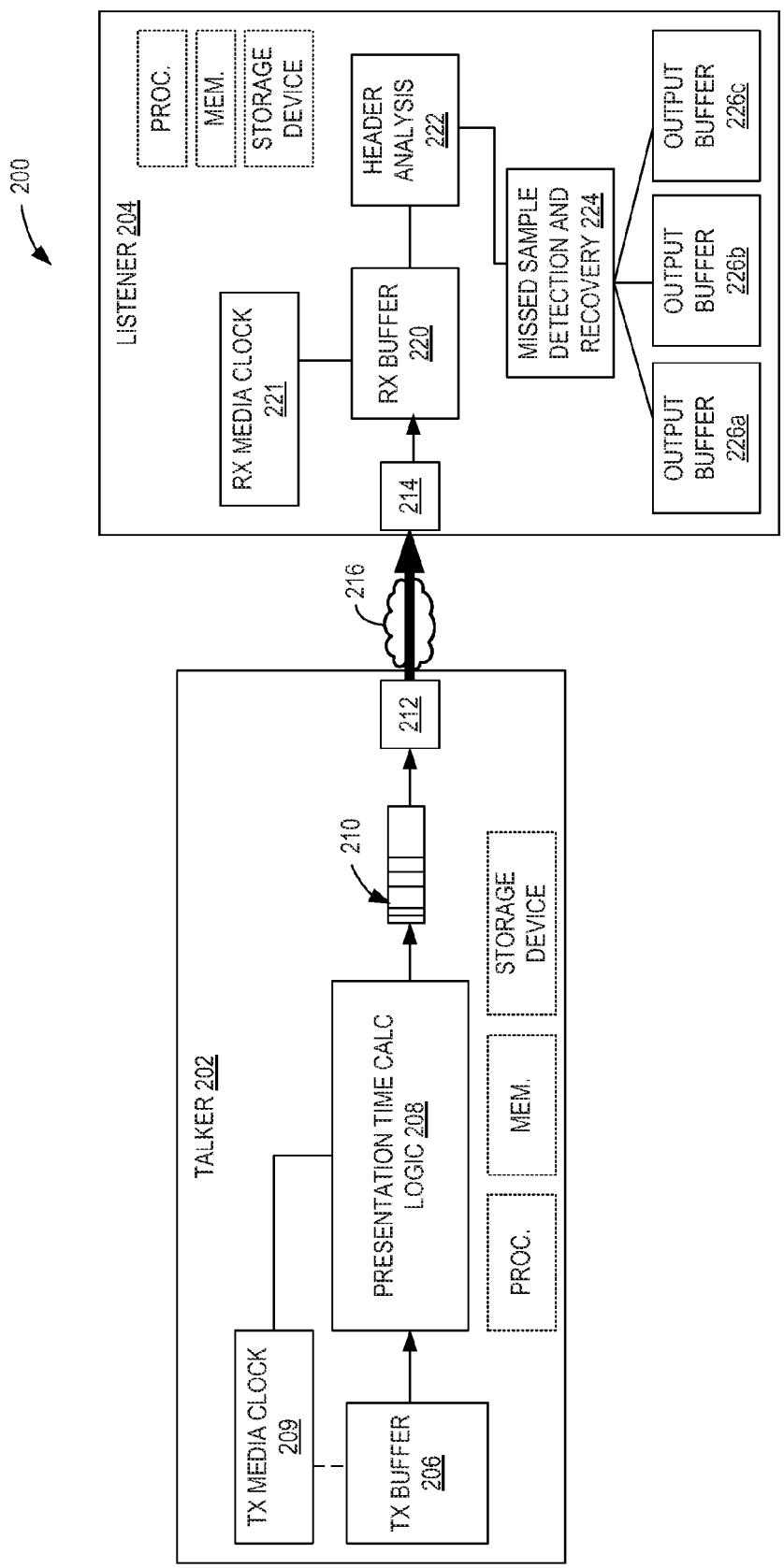
FIG. 2 shows an example communication system in accordance with one or more embodiments of the present disclosure.
Figure 3:
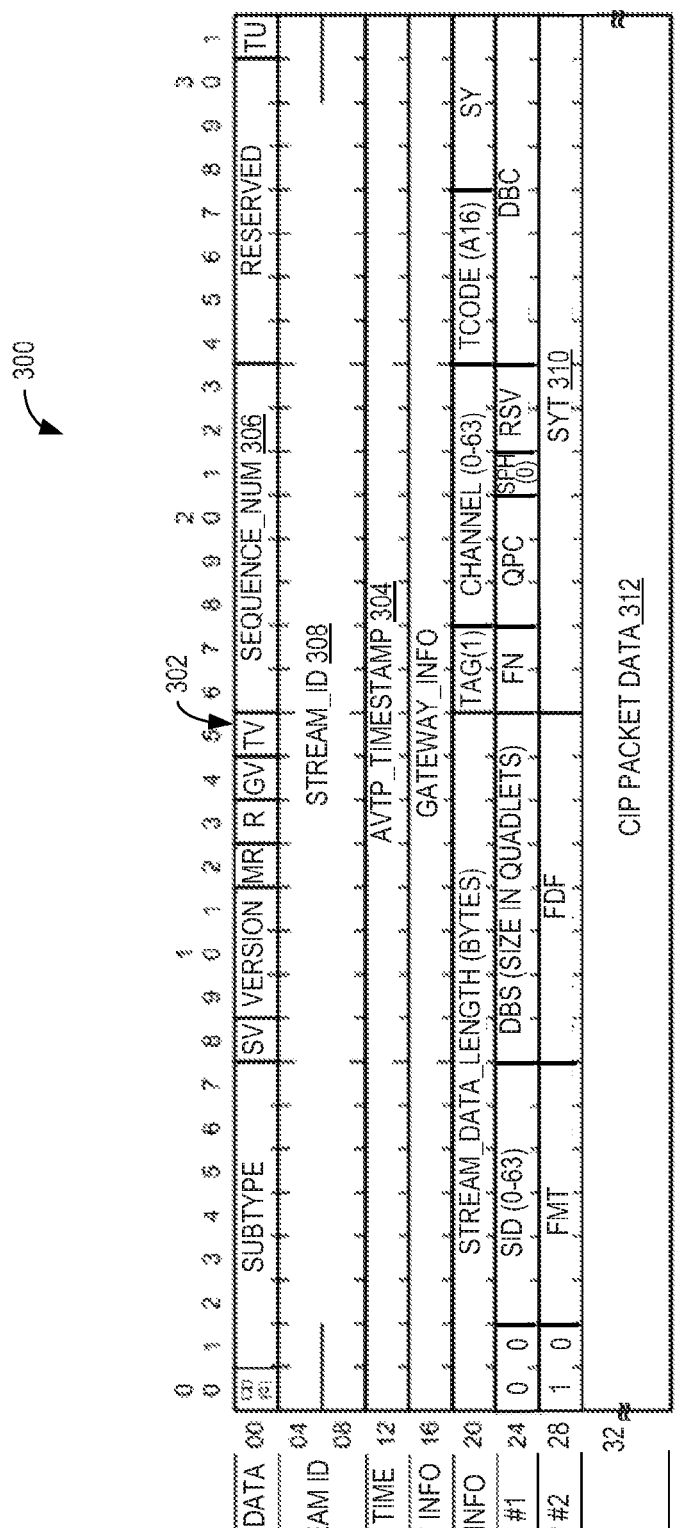
FIG. 3 shows an example packet structure in accordance with one or more embodiments of the present disclosure.

FIG. 2 is an example communication system 200 including a talker 202 and a listener 204. As described above, talker 202 may be any suitable device for sending an audio/video stream to listener 204 and listener 204 may be any suitable device for receiving and playing back the audio/video stream. For example, talker 202 may correspond to in-vehicle computing system 109 and listener 204 may correspond to speakers 112 and/or display 108 of FIG. 1. As illustrated, talker 202 may include a transmission buffer 206 configured to store data blocks of an audio/video stream. For example, if the audio/video stream is supplied from an external device (e.g., external device 150 and/or mobile device 128 of FIG. 1), the received data may be stored in transmission buffer 206 until the data is ready to be processed by presentation time calculation logic 208. Presentation time calculation logic may be a module including instructions executable by a processor of talker 202 for calculating the presentation time for that data block. The presentation time may be calculated based on a clock signal from transmission media clock 209. The presentation time calculation logic 208 and/or another suitable module of talker 202 (e.g., a packetizer, communication interface 212, etc.) may encapsulate each sample in a packet 210 including header information indicating a presentation time. In some examples, the validity of the presentation time may be indicated in the packet. Talker 202 may determine whether the presentation time is valid by performing a modulus operation of a total number of data blocks (e.g., a total number of data blocks included in all previously acquired samples of the audio/video stream) and a SYT_INTERVAL value. The SYT_INTERVAL value may indicate the number of data blocks between two successive valid AVTP_TIME-STAMP fields (e.g., between two successive presentation time designations). If the sum of the output of the module operation and the number of data blocks in the sample is less than the SYT_INTERVAL, the talker device may designate the sample as not including a valid presentation time (e.g., by setting a timestamp valid field to 0). Alternatively, if the sum is greater than or equal to SYT_INTERVAL, the talker device may designate the sample as including a valid presentation time (e.g., by setting a timestamp valid field to 1). An example packet structure is illustrated in FIG. 3 and described in more detail below.

The packet 210 may be transmitted from talker 202 (e.g., via a talker communication interface 212) to a listener 204 (e.g., via a listener communication interface 214) over a network (e.g., an AVB network 216). Accordingly, talker communication interface 212 and listener communication interface 214 may be configured to communicate via an AVB network (e.g., via the audio/video transport protocol, AVTP). Packet 210, as received at listener 204, may be provided to a receive buffer 220 for temporary storage. In turn the packet may progress to header analysis module 222 to decapsulate the packet and identify, among other parameters, a timestamp/presentation time included in the header and a timestamp_valid (TV) field value indicating the validity of the timestamp/presentation time included in the header. If the timestamp_valid field is set to 1 or another suitable value indicating that the presentation time included in that packet is valid, the packet is stored at receive buffer 220 at an indexed memory location that is based on the presentation time included in the packet. Otherwise, the presentation time may be ignored for that packet. In such examples, the packet may be stored at an indexed memory location that is selected based on a last received valid presentation time (e.g., a next empty index). Additionally or alternatively, the packet may be discarded and/or stored in a default location in the receive buffer 220 responsive to a determination that the presentation time included in the header for that packet is not valid.

Information determined from header analysis module 222 may be passed to missed sample detection and recovery module 224 for further processing. Missed sample detection and recovery module 224 may compare the timestamp of the incoming packet with a last received packet and determine whether any samples were missed based on the difference between the timestamps. For example, listener 204 may store or otherwise have access to a standard offset defining an expected difference between timestamps of successive packets received as a part of an audio/video stream. If the difference between the timestamp of an incoming packet and a last received packet is larger than the standard offset and/or larger than the standard offset by a threshold amount, a number of packets may be determined to have been missed. The number of packets determined to have been missed may be based on the size of the difference between the timestamps compared to the standard offset.

If the missed sample detection and recovery module 224 determines that one or more packets have been missed (e.g., were not received from the talker and/or were corrupted and the data rendered unsalvageable), module 224 may control, instruct, and/or otherwise cause one or more of the output buffers 226a-226c to copy sample data from the last received packet into the index or indices of the buffer corresponding to the missed packet. Module 224 may then pass the sample data for the incoming packet to one or more of the output buffers 226a-226c for storage at an index corresponding to the timestamp of the incoming packet.

The listener 204 may play out audio/video data (e.g., samples) from output buffers 226a-226c based on the index at which each sample is stored in an output buffer (e.g., output buffers 226a-226c) and/or when a receive media clock 221 of the listener reaches the presentation time associated with an index of the output buffer. The output buffers and/or the receive buffer may be time slotted buffers, each slot corresponding to a timing interval that is equal to an expected time difference between successive packets in received audio/video streams. In some embodiments, the output buffers and/or the receive buffer may be cyclic ring buffers, having a range that spans one or more time slots. In such embodiments, a packet following a packet that is stored in a last time slot of the buffer may be stored in a first time slot of the buffer, replacing any data that previously occupied that time slot. It is to be understood that any suitable buffers may be utilized for the output and receive buffers.

In some examples, the presentation time may be utilized to synchronize the receive media clock 221 with the transmission media clock 209. For example, if the network delay (e.g., the max transit time) is known by both the talker and the listener, the listener may compare a receive time with an expected receive time (e.g., based on a known transmission delay and the presentation time) and adjust the receive media clock based on a calculated error (e.g., the difference between the measured receive time and the expected receive time).

It is to be understood that one or more of the components of talker 202 and listener 204 may include and/or be included in a processor and/or storage device of talker 202 and listener 204. For example, transmission buffer 206 may include at least a portion of a storage device of talker 202, and presentation time calculation logic 208 may include instructions stored in the storage device of talker 202 and/or a processor for executing the instructions stored in the storage device of talker 202. Likewise, receive buffer 220 may include at least a portion of a storage device of listener 204, and a TV field analysis module may include instructions stored in the storage device of listener 204 and/or a processor for executing the instructions stored in the storage device of listener 204.

FIG. 3 illustrates an example packet 300 including a timestamp_valid field (e.g., "TV" field 302) and a presentation time (e.g., AVTP_TIMESTAMP field 304). For example, packet 300 may illustrate an example structure of packet 210 of FIG. 2. Other fields of note may include the SEQUENCE_NUM field 306, which may indicate a place of the packet in the audio/video stream (e.g., how many packets were sent before that packet in the current audio/video stream). STREAM_ID field 308 may indicate an identifier for the stream, which designates the stream to which the packet belongs. As described above, AVTP_TIMESTAMP field 304 indicates a time at which the packet is to be played back (e.g., a real time and/or a time that is reachable by a media clock of a listener). SYT field 310 may indicate a SYT_INTERVAL, which denotes the number of data blocks between two successive valid AVTP_TIMESTAMP fields. CIP PACKET DATA field 312 may include the payload of the packet (e.g., while each of the other fields illustrated in FIG. 3 and/or described above make up the header of the packet). For example, CIP PACKET DATA field 312 may include the audio/video data blocks/samples to be played back at the time indicated in the AVTP_TIMESTAMP field 304.

Figure 4:
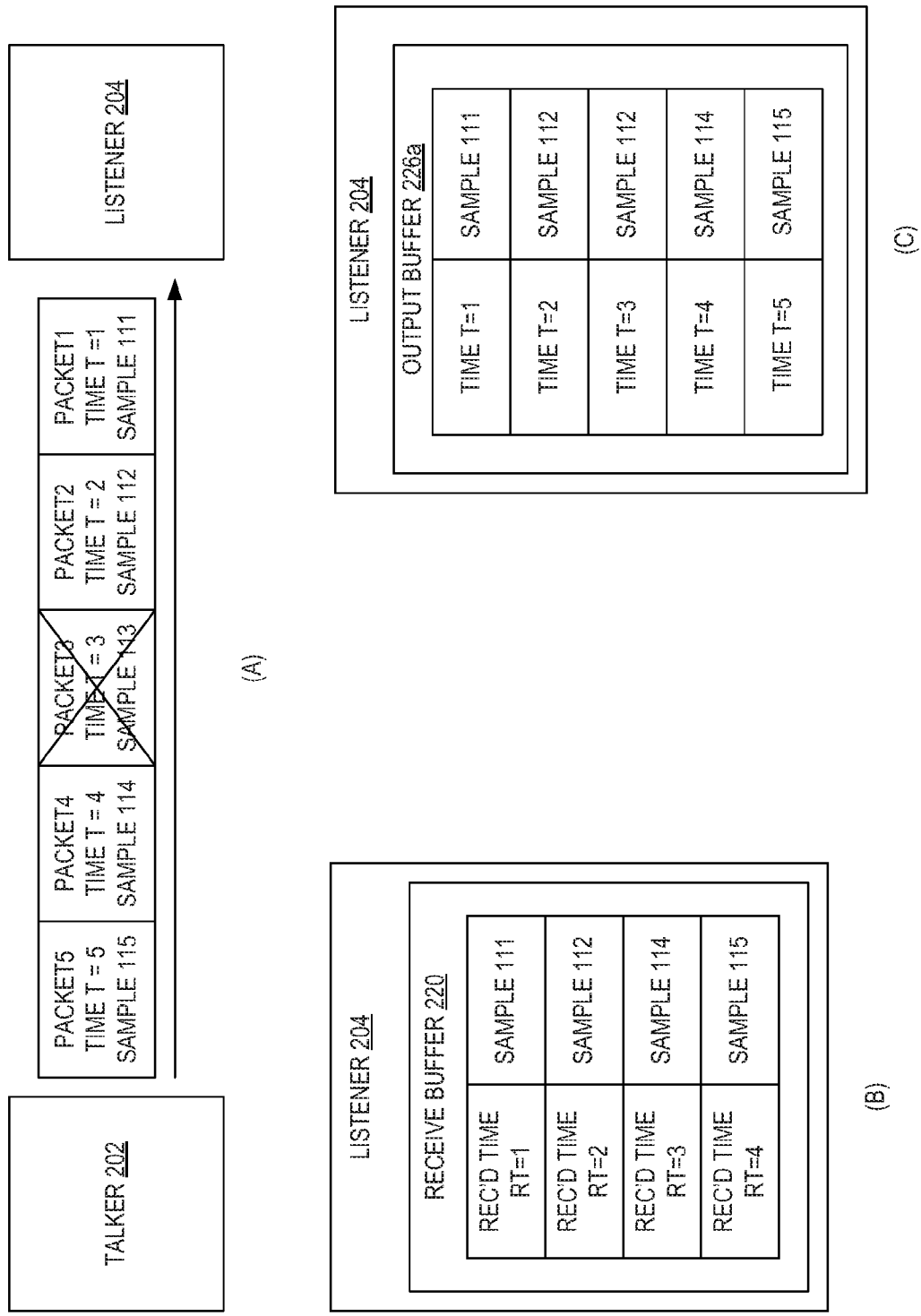
FIG. 4 is a series of block diagrams showing an example response to detecting a missing sample in accordance with one or more embodiments of the present disclosure.

FIG. 4 is a collection of block diagrams illustrating a response to detecting missing packets at a listener device of a communication system. As indicated at (A), talker 202 may send a stream of packets including packets 1-5 to listener 204. The "X" through packet 3 indicates that that packet was lost in transit, corrupted, or otherwise unavailable for processing/output by the listener 204. It is to be understood that, as used herein, the term "missing" may relate to any of the aforementioned scenarios (e.g., lost, corrupted, and/or otherwise unavailable for processing/output by the listener). As a result of the missing packet, the listener may receive the first two samples (samples 1 and 2) at the proper time (e.g., at receive time RT=1 and 2, respectively) and the last two samples (samples 4 and 5) at a receive time that is one timeslot earlier than expected (e.g., at receive time RT=3 and 4, respectively), as indicated at (B).

Responsive to detecting that packet 3 was lost, the listener may stuff the index of the output buffer corresponding to the presentation/transmit timestamp associated with this packet (e.g., time T=3) with the sample from the prior received packet (e.g., sample 112 from packet 2), as indicated at (C). The other indices may be filled with samples from the proper packets having an associated presentation/transmit timestamp. For example, packet 1 is indicated as having a presentation and/or transmit timestamp of time T=1, thus sample 111 within packet 1 is stored at the index of the output buffer associated with time T=1.

Figure 5:
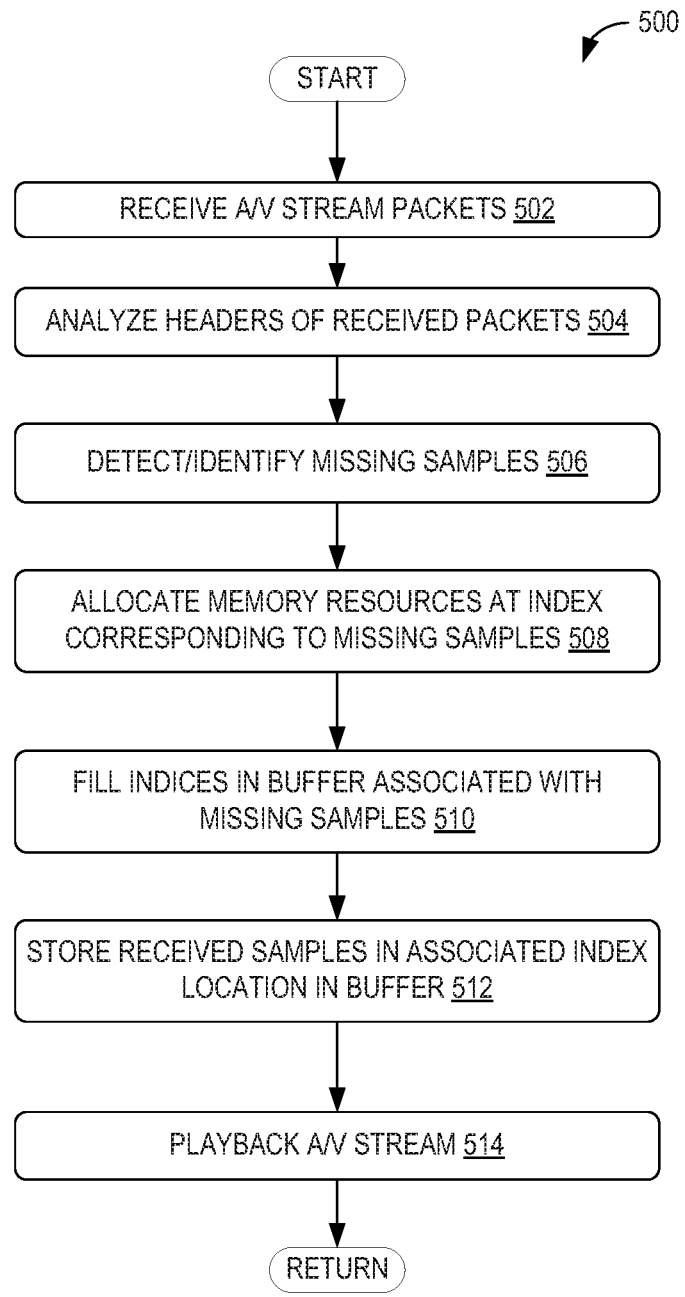
FIG. 5 is a flow chart for an example method of detecting and recovering from missing samples in accordance with one or more embodiments of the present disclosure.

FIG. 5 is a flow chart of a method 500 for detecting and recovering from missing samples. Method 500 may be performed by a listener in an AVB network, such as listener 204 of FIG. 2, and/or any other suitable computing device. At 502, the method includes receiving packets of an audio/video stream. At 504, the method includes analyzing headers of received packets. For example, packet headers may be analyzed by a header analysis module (e.g., header analysis module 222 of FIG. 2) to determine a time stamp associated with the packet (e.g., denoting a transmit time, a presentation time, etc.). At 506, method 500 includes detecting and/or identifying whether samples/packets have been missed. A more detailed example of detecting and identifying missing samples is described below with respect to FIG. 6.

At 508, method 500 includes allocating memory resources for any identified missing samples. For example, in a buffer, memory locations having an index corresponding to the identity of the missing samples (e.g., being associated with timestamps that were to be included in the missing packets carrying the missing samples) may be allocated. At 510, the method includes filling the indices in the buffer associated with the missing samples with data from another sample. For example, the sample from the last received packet (e.g., the packet prior to a current incoming packet) may be inserted into the indexed memory locations corresponding to the missing samples. In other examples, the sample included in a current incoming packet (e.g., the packet that triggered/resulted in the detection/identification of missing samples) may be inserted into the indexed memory locations corresponding to the missing samples. In still other examples, if multiple successive missing packets are detected, some indexed memory locations of the buffer associated with the missing packets may be filled with sample data from a last received packet and other indexed memory locations of the buffer associated with the missing packets may be filled with sample data from the current incoming packet.

The memory filling step described at 510 may only be performed under certain conditions in some embodiments. For example, if a buffer condition (e.g., a length of time that data is to be stored in a buffer before playback) is less than a threshold, the memory index may be filled with an already received sample and/or an incoming sample and the actual missing data (e.g., the sample(s) in the packet that was not received) may not be recovered/stored in the buffer. Other criteria may be utilized to determine that the above-described first condition for not recovering actual missing data is met, such as a network condition (e.g., throughput rate, a network quality/stability, etc.) being less than a threshold and/or a quality of service (QoS) parameter being less than or greater than an associated threshold. For example, a QoS parameter may include a transmission delay requirement (e.g., defining a maximum amount of acceptable transmission delay), in which case the first condition may be met when the transmission delay requirement is less than an associated threshold. In this example, a transmission delay requirement that is very low indicates a low tolerance for delays in communication, so a routine to recover the actual missing data may cause the QoS parameter to not be met. In other examples, the QoS parameter may include an error requirement (e.g., defining a maximum amount of error), in which case the first condition may be met when the error requirement is greater than an associated threshold. In this example, an error requirement that is very high may indicate a high tolerance for errors (e.g., missing/repeated samples) in an output stream, so a routine to recover actual missing data may be of low importance and may not be performed. It is to be understood that the first condition may be met based on a combination of the above-described criteria and/or other suitable criteria, in which case some criteria may be weighted more than others.

If the first condition(s) is not met and/or if a second condition(s) is met, the actual missing sample data may be recovered and stored at the appropriate location in memory (e.g., at the indexed location allocated as described above). For example, if a buffer condition (e.g., a length of time that data is to be stored in a buffer before playback) is greater than a threshold, the listener device may send a request to the talker device to retransmit the skipped packet, receive the retransmitted packet, and fill the memory index with the actual missing data (e.g., the sample(s) in the packet that was skipped/not initially received, but received after a retransmission request). In this example, the threshold may be based on an expected retransmission time in order to ensure that the buffer will not be played back before the retransmission request completes and the retransmitted sample is stored in the buffer. Other criteria may be utilized to determine that the above-described second condition for recovering actual missing data is met, such as a network condition (e.g., throughput rate, a network quality/stability, etc.) being greater than a threshold and/or a quality of service (QoS) parameter being less than or greater than an associated threshold. For example, a QoS parameter may include a transmission delay requirement (e.g., defining a maximum amount of acceptable transmission delay), in which case the second condition may be met when the transmission delay requirement is greater than an associated threshold. In other examples, the QoS parameter may include an error requirement (e.g., defining a maximum amount of error), in which case the second condition may be met when the error requirement is less than an associated threshold. It is to be understood that the second condition may be met based on a combination of the above-described criteria and/or other suitable criteria, in which case some criteria may be weighted more than others.

If no missing samples are detected/identified at 506, the memory allocation and filling steps described at 508 and 510 may be skipped and may not be performed. At 512, method 500 includes storing the received samples in associated index locations in the buffer. For example, the index locations may indicate a timestamp (e.g., a presentation time, a relative location in a stream, etc.) and sample(s) from a packet having a timestamp that matches the index (e.g., that is within a threshold of the index) is stored in that indexed location. At 514, method 500 includes playing back the audio/video stream. For example, the samples from the indexed buffer may be played back and/or provided to output devices to be presented to a user at a presentation time.

Figure 6:
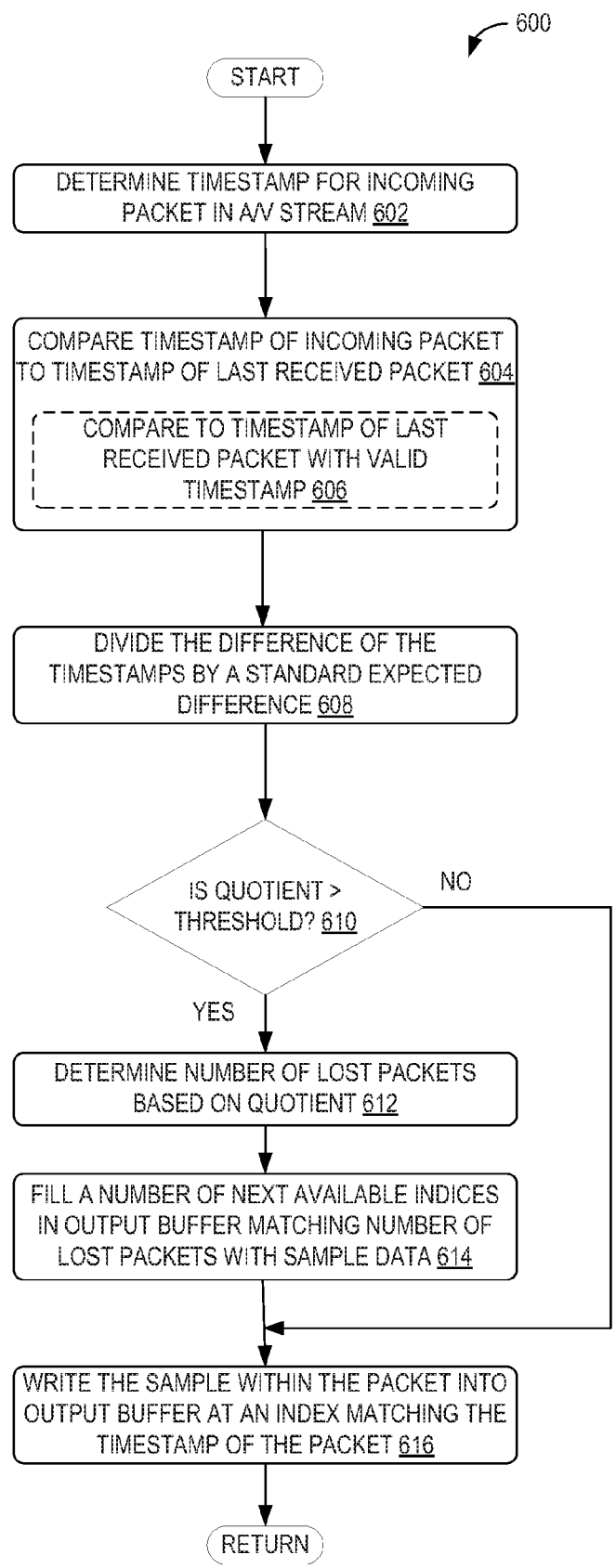
FIG. 6 is a flow chart for an example method of determining that samples are missing in an audio/video stream in accordance with one or more embodiments of the present disclosure.

FIG. 6 is a flow chart of an example method 600 of detecting and identifying missing samples in an audio/video stream. For example, all or part of method 600 may be performed during execution of method 500 (e.g., at 506) illustrated in FIG. 5. It is to be understood that method 600 may be repeated for each received packet in an audio/video stream. At 602, method 600 includes determining a timestamp for an incoming packet in an audio/video stream. At 604, method 600 includes comparing the timestamp of the incoming packet to a timestamp of a last received packet. If no packet was received prior to the incoming packet, the timestamp may be compared to a standard/default timestamp associated with a first packet in an audio/video stream. As indicated at 606, the timestamp may be compared to a timestamp of a last received packet with a valid timestamp (e.g., a last received packet having a timestamp_valid field set to 1) in order to ensure that the timestamp is being compared to a verified timestamp.

At 608, method 600 includes dividing the difference of the timestamps (e.g., the timestamp of the incoming packet and the timestamp of the last received packet/last received packet with a valid timestamp) by a standard and/or expected difference to determine an offset between the two successively received packets. For example, the standard and/or expected difference may be a predefined value indicating the difference between timestamps (or between valid timestamps) of two successive packets in an audio/video stream. The standard difference may be based on parameters defined for a class of data associated with the audio/video stream. For example, class C data may have a sample rate of 48 kHz and a SYT_INTERVAL of 64 (e.g., indicating that a packet is able to hold a maximum of 64 data samples). In this example, the standard difference may be defined by dividing the number of samples per packet (64) by the sample rate (48000) to determine the amount of time between each successive transmitted packet (1.3 ms).

At 610, the quotient determined at 608 is compared to a threshold to determine whether the quotient is greater than the threshold. For instance, using the example described above with a standard difference of 1.3 ms, if an observed/calculated difference between successively received packets is 1.3 ms, the quotient determined at 608 would be 1 (e.g., 1.3 ms observed difference divided by 1.3 ms standard/expected difference). Thus, a quotient of 1 indicates that the successively received packets were received in an expected time frame. A quotient of 2 or more (e.g., an observed calculated difference of 2.6 or more using the example described above) indicates that at least one packet was missed, as such a quotient indicates that at least one packet was able to have been sent in the time between successively received packets and thus was expected. Accordingly, in some examples, the threshold may be equal to 2. It is to be understood that any suitable threshold may be utilized. For example, if additional spacing between successively received packets is to be expected, then the threshold may be increased to accommodate the expected gaps.

If the quotient is larger than the threshold (e.g., "YES" at 610), the method proceeds to 612 to determine a number of lost/missing packets based on the quotient. For example, for a quotient Q and a threshold T, the number of lost/missing packets may be (Q−T)+1. Using the example values described above, if the observed difference is 2.6 ms, the quotient (2.6/1.3) would be 2. Using the example threshold of 2, the number of lost/missing packets would be (2−2)+1=1. In another example where the observed difference is 3.9 ms, the quotient would be 3 (3.9/1.3), and the number of lost/missing packets would be 2 ([3−2]+1). It is to be understood that the calculation of the number of lost/missing packets may be adjusted based on the definition of the threshold. After determining the number of lost packets, the method continues to 614 to fill a number of next available indices in an output buffer matching the number of lost packets with sample data. For example, the sample data may be from a last valid received packet and/or from any other source as described above with respect to FIG. 5. In the example described above, where two packets are determined to have been lost, the sample data from the last received packet may be stored in the next available memory locations in the buffer (e.g., the memory locations with indices corresponding to the missed packets). The memory filling described at 614 may also be referred to herein as sample stuffing. By stuffing the memory with samples from a previously received packet, the audio/video stream may be output with limited disruption, as the following received packets are placed in the intended location in the buffer.

As indicated at 616, the method includes writing the sample within the current incoming packet into the output buffer at an index matching the timestamp of the packet (and/or at a next available index after performing the sample stuffing at 614). If the quotient is not determined to be greater than the threshold at 610 (e.g., if no packets are determined to be lost), the method may progress directly from 610 to 616.

Figure 7:
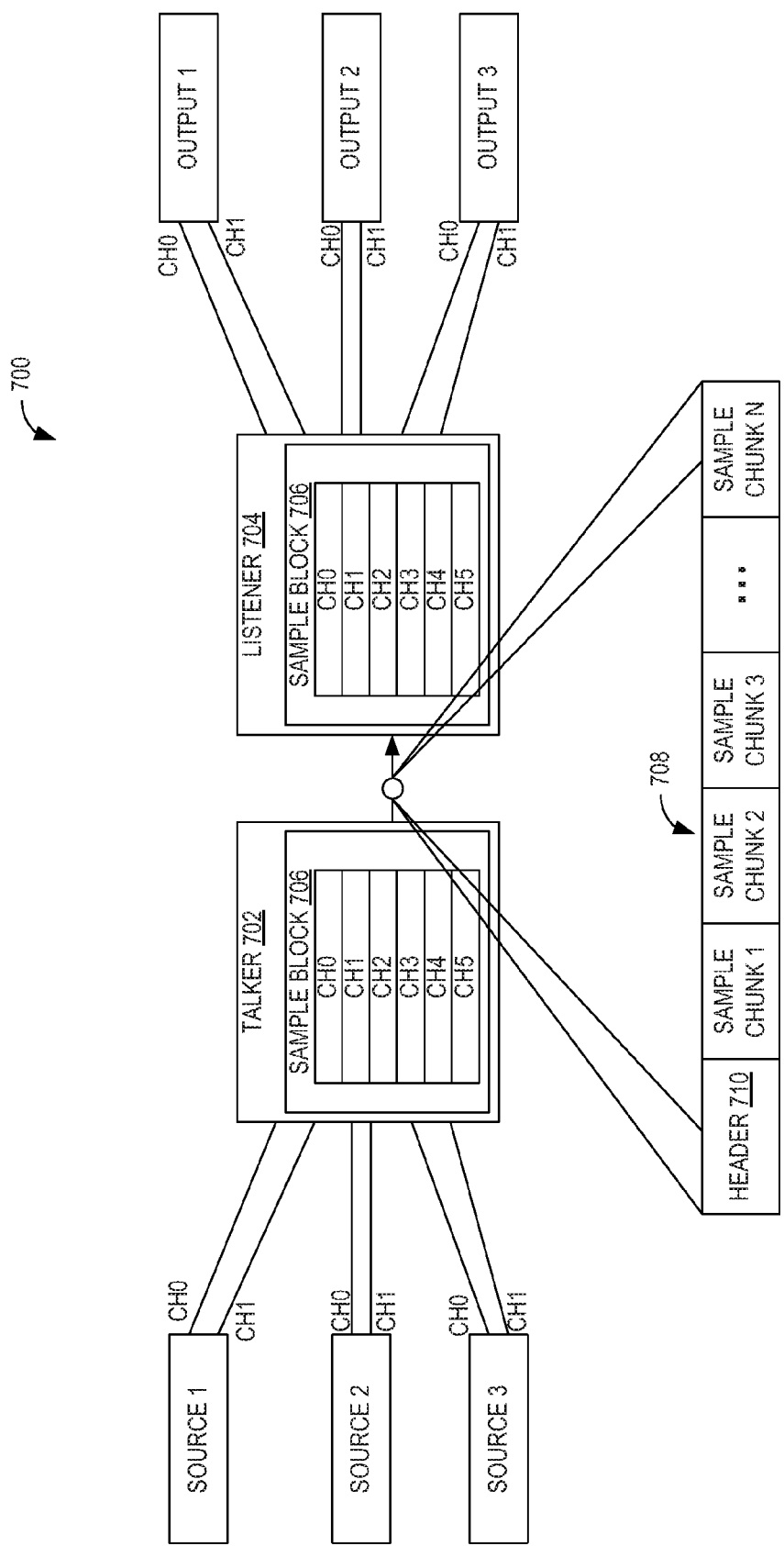
FIG. 7 shows an example communication system for sending audio/video data as a super stream in accordance with one or more embodiments of the present disclosure.

FIG. 7 is an example communication system 700 for sending data from multiple sources as a super stream. For example, as described above, packets may be sent between a talker (e.g., talker 702) and a listener (listener 704) in an AVB network. Multiple sources (e.g., sources 1-3) may provide data for audio/video streams to a talker for transmission to a listener. In some systems, a packet may only include samples from a single source. In such systems, a different group of packets may be utilized to send samples from each of the multiple sources, resulting in high overhead (e.g., increased bandwidth usage due to increased data transmission) as separate header information is provided for each packet in the different groups of packets. In the illustrated system, data from the multiple sources may be combined into a single packet, allowing for a single super stream (e.g., an audio/video stream including packets that each have samples from multiple sources).

As illustrated, each source may transmit data on multiple channels. Talker 702 may generate sample blocks (e.g., sample block 706) including samples from each channel of each source (and/or from a subset of the sources). A packet 708 may include a header 710 and one or more sample chunks (e.g., sample chunks 1-n). A chunk may be a collection of data included in a packet (e.g., in a payload portion of a packet). For example, a chunk may include a portion of audio/video data from one or more audio/video streams. Each sample chunk may include all or a portion of a sample block (e.g., sample block 706). Thus, each sample chunk may include samples obtained from multiple sources. The arrangement of source channel data at talker 702 may be based on a channel map. Turning briefly to FIG. 8, an example channel map 800 is illustrated. In the example channel map 800, 3 audio sources (e.g., sources 1-3 in FIG. 7) each provide data on two channels (e.g., channels 0 and 1, as illustrated in FIG. 7 and listed in the second column of channel map 800 in FIG. 8). The super stream may include a different channel for each channel of each audio source, resulting in channels 0-5 illustrated in the last column of channel map 800. Accordingly, channel 0 of audio source 1 may be mapped to channel 0 of the super stream, channel 1 of audio source 1 may be mapped to channel 1 of the super stream, channel 0 of audio source 2 may be mapped to channel 2 of the super stream, etc. In an example vehicle environment, a first source may be a device connected via a USB cable (e.g., providing music playback), a second source may be a navigation application of an in-vehicle computing system (e.g., providing turn-by-turn navigation instructions), and a third source may be audio prompts from an operating system (e.g., alerts, query prompts, etc.). The output devices may include different speakers within the vehicle. Under certain conditions, audio from different sources may be output by different speakers to emphasize the different types of audio. Accordingly, mapping sources to channels in the super stream ensures that the output will be presented at the proper output device.

Returning to FIG. 7, the channel map (e.g., channel map 800 of FIG. 8) may be utilized to reconstruct the audio stream at listener 704. Using the channel map, the listener may determine which channel of the super stream includes samples from a particular channel of a particular source in order to provide that data to the proper channel for a given output device (e.g., output devices 1-3). For example, channels 0 and 1 of Output device 2 may be configured to receive data from channels 0 and 1 of source 3, respectively. In order to ensure the right data is provided to the right output, the listener may utilize a channel map to determine where in the super stream channels 0 and 1 of source 3 are positioned and provide samples in those locations to channels 0 and 1 of Output 2. It is to be understood that in some embodiments, a subset of the sources communicatively connected to talker 702 may provide data for inclusion in a super stream. For example, sources 1 and 3 may provide data while source 2 does not. In such embodiments, talker 702 may generate packets that include only data from sources 1 and 3. The headers for each packet is such examples may identify a channel map corresponding to the use of sources 1 and 3. Such identification may also be used to designate the packet as belonging to a super stream in general. For example, if a data from a single source is included in the packet, the header may indicate that the packet is not a part of a super stream, while if data from multiple sources is included in the packet, the header may indicate that the packet is part of a super stream and/or identify a channel map for use in demultiplexing the super stream. Additionally or alternatively, the talker may fill channels in the super stream corresponding to data from source 2 with filler/dummy samples or leave said channels blank (e.g., empty of data). In additional or alternative embodiments, a particular source may be communicatively connected to multiple talkers. In such embodiments, each talker may utilize a channel map associated with the sources connected with that talker.

Figure 9:
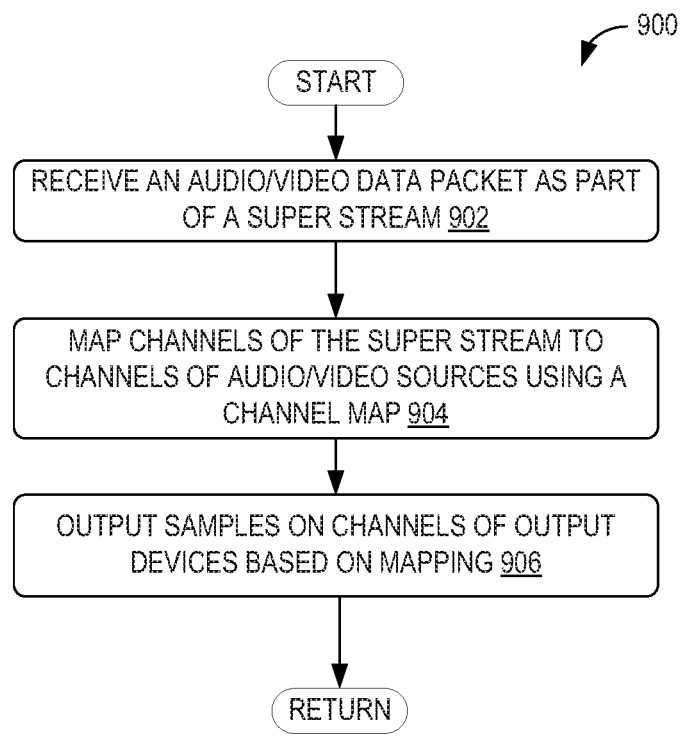
FIG. 9 is a flow chart for an example method of receiving audio/video data as a super stream in accordance with one or more embodiments of the present disclosure.

FIG. 9 is a flow chart of an example method 900 for receiving and outputting audio/video data from a super stream. For example, method 900 may be performed by listener 704 of FIG. 7. At 902, method 900 includes receiving an A/V packet as part of a super stream. At 904, method 900 includes mapping channels of the super stream to channels of audio/video sources using a channel map. For example, channel map 800 of FIG. 8 may be utilized to determine which channels of which audio/video sources sent which data samples. At 906, method 900 includes outputting samples on channels of output devices based on the mapping. The samples may be saved in a super buffer based on the channel mapping and samples from different indices of the super buffer may be output to the output devices as a designated time in some embodiments. For example, a selected output device may be designated as receiving data from a selected source device, the selected source device may be designated as transmitting data to the selected output device, and/or the selected output device may be designated as receiving a type of data included in the super stream that is identifiable by the listener.

As described above, packets in an audio/video stream may be lost during transmission, resulting in disruptions of playback at an output device. By examining timestamps to detect missing packets and filling memory locations of a buffer with data from a last received packet, disruptions may be minimized. Further, sending data from multiple sources via a super stream decreases the overhead (e.g., bandwidth usage) involved in sending multiple streams (e.g., a stream for each source).

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the in-vehicle computing system 109 and/or talker 202/listener 204 described with reference to FIGS. 1 and 2. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A system, comprising:
a processor; and
a storage device storing instructions executable by the processor to:
determine that a first sample, of a plurality of samples in an audio/video data stream, was not received by a listener device in an audio video bridging system;
allocate a first entry in a time slotted buffer for the first sample, wherein the first entry corresponds to a timestamp associated with the first sample;
when a first condition is met,
not recover the first sample; and
fill the first entry in the time slotted buffer with a second sample immediately preceding the first sample in the audio/video data stream; and
when the first condition is not met,
recover the first sample; and
fill the first entry in the time slotted buffer with the first sample.

2. The system of claim 1, wherein the second sample is stored in a second entry in the time slotted buffer prior to filling the first entry in the time slotted buffer, wherein the time slotted buffer includes a plurality of entries indexed based on a sequence of timestamps of the audio/video data stream, and wherein a second timestamp immediately precedes the first timestamp in the sequence of timestamps; and wherein recovering the first sample comprises the listener device sending a request to a talker device to retransmit the first sample, and receiving the first sample at the listener device.

3. The system of claim 1, the instructions further executable to:
fill a third entry in the time slotted buffer with a third sample in the audio/video data stream, wherein the first sample immediately precedes the third sample in the audio/video data stream; and
wherein the first condition comprises a network throughput being less than a throughput threshold.

4. The system of claim 1, wherein determining that the first sample was not received by the listener device comprises:
computing a difference of a timestamp of a current sample in the audio/video data stream and a timestamp of the second sample;
determining a standard offset based on a class of the audio/video data stream;
determining that a quotient of the difference and the standard offset exceeds a predefined threshold; and
wherein the first condition comprises a length of time that data spends in the time slotted buffer being less than a threshold time.

5. The system of claim 4, wherein the class of the audio/video data stream specifies a number of samples of the audio/video data stream per unit of time, and wherein the first condition further comprises a network stability being less than a threshold stability.

6. The system of claim 1, wherein the audio/video data stream is a super stream including samples from multiple source devices, and wherein the first condition comprises a transmission delay being greater than a threshold delay.

7. The system of claim 6, wherein the instructions are further executable to map channels of the super stream to channels of audio/video sources using a channel map and output samples based on the channel map.

8. A method, comprising:
determining that a first sample, of a plurality of samples in an audio/video data stream, was not received by a listener device in an audio video bridging system;
allocating a first entry in a time slotted buffer for the first sample, wherein the first entry corresponds to a timestamp associated with the first sample;
when a first condition is met,
not recovering the first sample; and
filling the first entry in the time slotted buffer with a second sample immediately preceding the first sample in the audio/video data stream; and
when the first condition is not met,
recovering the first sample; and
filling the first entry in the time slotted buffer with the first sample.

9. The method of claim 8, wherein the second sample is stored in a second entry in the time slotted buffer prior to filling the first entry in the time slotted buffer, the time slotted buffer including a plurality of entries indexed based on a sequence of timestamps of the audio/video data stream, and wherein a second timestamp immediately precedes the first timestamp in the sequence of timestamps; and
wherein recovering the first sample comprises the listener device sending a request to a talker device to retransmit the first sample, and receiving the first sample at the listener device.

10. The method of claim 8, further comprising:
filling a third entry in the time slotted buffer with a third sample in the audio/video data stream, wherein the first sample immediately precedes the third sample in the audio/video data stream; and
wherein the first condition comprises a length of time that data spends in the time slotted buffer being less than a threshold time.

11. The method of claim 8, wherein determining that the first sample was not received by the listener device comprises:
computing a difference of a timestamp of a current sample in the audio/video data stream and a timestamp of the second sample;
determining a standard offset based on a class of the audio/video data stream; and
determining that a quotient of the difference and the standard offset exceeds a predefined threshold;
wherein the first condition comprises a network throughput being less than a throughput threshold.

12. The method of claim 11, wherein the class of the audio/video data stream specifies a number of samples of the audio/video data stream per unit of time; and further comprising:
determining that a third sample, of the plurality of samples, was not received by the listener device, the third sample following the first sample;
allocating a third entry in the time slotted buffer for the third sample, wherein the third entry corresponds to a timestamp associated with the third sample;
when the first condition is met,
not recovering the third sample; and
filling the third entry in the time slotted buffer with a fourth sample immediately following the third sample in the audio/video data stream; and
when the first condition is not met,
recovering the third sample; and
filling the third entry in the time slotted buffer with the third sample.

13. The method of claim 8, wherein the audio/video data stream is a super stream including samples from multiple source devices, and wherein the first condition comprises a transmission delay being greater than a threshold delay.

14. The method of claim 13, further comprising mapping channels of the super stream to channels of audio/video sources using a channel map and outputting samples based on the channel map.

15. A communication system, comprising:
a talker device configured to transmit samples in an audio/video stream; and
a listener device communicatively connected to the talker device and configured to receive the audio/video stream from the talker device, the listener device comprising a header analysis module, a missed sample detection and recover module, an output buffer, and instructions executable by a processor of the listener device to:
determine a timestamp for an incoming packet in the audio/video stream with the header analysis module;
determine that a first packet, immediately preceding the incoming packet in the audio/video stream, was not received by the listener device based on a difference between the timestamp for the incoming packet and a timestamp of a last received packet;
allocate a first entry in the output buffer for the first packet;

when a first condition is met,
  not recover the first packet; and
  fill the first entry in the output buffer with a sample from the incoming packet; and
when the first condition is not met,
  recover the first packet; and
  fill the first entry in the output buffer with a sample from the first packet.

16. The communication system of claim 15, wherein the sample from the incoming packet is stored in a second entry in the output buffer prior to filling the first entry in the output buffer, and wherein the output buffer includes a plurality of entries indexed based on a sequence of timestamps of the audio/video stream, and wherein the first condition comprises a network throughput being less than a throughput threshold.

17. The communication system of claim 15, the instructions further executable to, when the first condition is met, fill a third entry in the output buffer with the sample from the incoming packet, and wherein the first condition comprises a network stability being less than a threshold stability.

18. The communication system of claim 15, wherein determining that the first packet was not received by the listener device comprises:
  determining a standard offset based on a class of the audio/video stream;
  determining that a quotient of the difference and the standard offset exceeds a predefined threshold;
  determining that a second packet, different from the first packet and immediately following the last received packet in the audio/video stream, was not received by the listener device based on the difference between the timestamp for the incoming packet and the timestamp of the last received packet;
  allocating a second entry in the output buffer for the second packet; and
  when the first condition is met, filling the second entry in the output buffer with a sample from the last received packet.

19. The communication system of claim 18, wherein the class of the audio/video stream specifies a number of samples of the audio/video stream per unit of time, and wherein the first condition comprises a transmission delay being greater than a threshold delay.

20. The communication system of claim 15, wherein the audio/video stream is a super stream, and wherein the instructions are further executable to map channels of the super stream to channels of audio/video sources communicatively connected to the talker device using a channel map;
  determining that a second packet, different from the first packet and immediately following the last received packet in the audio/video stream, was not received by the listener device based on the difference between the timestamp for the incoming packet and the timestamp of the last received packet;
  allocating a second entry in the output buffer for the second packet; and
  when the first condition is met, filling the second entry in the output buffer with the sample from the incoming packet.

* * * * *